United States Patent
Hartmann et al.

(10) Patent No.: US 7,886,712 B2
(45) Date of Patent: Feb. 15, 2011

(54) METHOD AND DEVICE FOR OPERATING AN INTERNAL COMBUSTION ENGINE

(75) Inventors: Dirk Hartmann, Stuttgart (DE); Georg Mallebrein, Kortal-Muenchingen (DE); Werner Mezger, Eberstadt (DE); Andreas Roth, Muehlacker-Lomersheim (DE); Henri Barbier, Schwieberdingen (DE); Nikolas Poertner, Stuttgart (DE); Juergen Rappold, Ilsfeld-Auenstein (DE); Ingo Fecht, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/304,910

(22) PCT Filed: Feb. 8, 2008

(86) PCT No.: PCT/EP2008/051544

§ 371 (c)(1),
(2), (4) Date: Jun. 1, 2009

(87) PCT Pub. No.: WO2008/098880

PCT Pub. Date: Aug. 21, 2008

(65) Prior Publication Data

US 2010/0000495 A1     Jan. 7, 2010

(30) Foreign Application Priority Data

Feb. 13, 2007  (DE) ....................... 10 2007 006 937

(51) Int. Cl.
*F02B 5/00*  (2006.01)
(52) U.S. Cl. .................... 123/305; 123/406.11; 701/105
(58) Field of Classification Search ................ 123/305, 123/491, 179.15–179.17, 406.11, 406.45, 123/406.47; 701/103–105
See application file for complete search history.

(56) References Cited

U.S. PATENT DOCUMENTS 4,186,701 A    2/1980   Hata et al.

(Continued)

FOREIGN PATENT DOCUMENTS

DE           199 46 730          4/2001

(Continued)

OTHER PUBLICATIONS

International Search Report, PCT/EP2008/051544 dated Jul. 11, 2008.

*Primary Examiner*—Stephen K Cronin
*Assistant Examiner*—Johnny H Hoang
(74) *Attorney, Agent, or Firm*—Kenyon & Kenyon LLP

(57) ABSTRACT

A method and a device for operating an internal combustion engine make it possible to shift the combustion limit. In this context, a predefined output variable of the internal combustion engine such as the torque, for example, is realized in at least one operating state of the internal combustion engine by at least a retardation of an ignition angle. It is checked whether, due to the retardation of the ignition angle, a variable like, for example, a misfiring, characteristic for the combustibility of the air/fuel mixture in a combustion chamber of the internal combustion engine, exceeds a predefined limiting value in terms of a deterioration of the combustibility, and in this case, at least one actuator of the internal combustion engine, different from an actuator for setting the ignition angle, such as the exhaust-gas recirculation valve or EGR valve, for instance, is controlled along the lines of improving the combustibility of the air/fuel mixture.

13 Claims, 4 Drawing Sheets

U.S. PATENT DOCUMENTS

| | | | |
|---|---|---|---|
| 4,843,556 A * | 6/1989 | Wakeman et al. | 701/111 |
| 5,038,635 A * | 8/1991 | Takizawa | 477/151 |
| 5,749,334 A | 5/1998 | Oda et al. | |
| 6,021,765 A | 2/2000 | Degroot et al. | |
| 6,328,016 B1 * | 12/2001 | Takahashi et al. | 123/406.35 |
| 6,467,458 B1 * | 10/2002 | Suzuki et al. | 123/491 |
| 6,636,797 B2 * | 10/2003 | Yoshizawa et al. | 701/104 |
| 6,659,073 B1 * | 12/2003 | Franke et al. | 123/299 |
| 6,769,402 B2 * | 8/2004 | Franke et al. | 123/406.16 |
| 6,769,404 B2 * | 8/2004 | Aoyama et al. | 123/406.29 |
| 6,814,054 B2 * | 11/2004 | Sauler et al. | 123/406.21 |
| 7,134,423 B2 * | 11/2006 | Zhu et al. | 123/406.14 |
| 7,680,580 B2 * | 3/2010 | Yasui et al. | 701/103 |
| 2003/0083802 A1 * | 5/2003 | Miyano | 701/114 |

FOREIGN PATENT DOCUMENTS

| | | |
|---|---|---|
| DE | 10 2004 011 589 | 9/2005 |
| EP | 1 296 058 | 3/2003 |
| GB | 2 279 697 | 1/1995 |

* cited by examiner

METHOD AND DEVICE FOR OPERATING AN INTERNAL COMBUSTION ENGINE

FIELD OF THE INVENTION

The present invention relates to a method and a device for operating an internal combustion engine.

BACKGROUND INFORMATION

For a torque-neutral switchover of the internal combustion engine to a new engine operating mode having a smaller adjustable torque range, e.g., for a switchover from full-engine operation to half-engine operation in which only half the cylinders of the internal combustion engine are activated compared to full-engine operation, it is already known to build up the charge of the internal combustion engine accordingly prior to the switchover to the new engine operating mode, in order to be able to compensate for the jump in torque at the instant of the switchover. During the charge buildup, the additional torque share above the charge buildup for the combustion must be offset, in order to constantly be able to adjust a desired setpoint torque at the output of the combustion engine during the switchover.

This is accomplished via a retardation of the ignition angle up to a combustion limit of the internal combustion engine. The retardation of the ignition angle means, on one hand, a decrease in engine efficiency, which is associated with higher fuel consumption, but on the other hand, in comparison to an injection blank-out, for example, does not cause a deterioration of the exhaust-gas quality.

SUMMARY

In contrast, the method of example embodiments of the present invention and the device of example embodiments of the present invention for operating an internal combustion engine having the features described herein have the advantage that it is checked whether, due to the retardation of the ignition angle, a variable characteristic for the combustibility of the air/fuel mixture in a combustion chamber of the internal combustion engine exceeds a predefined limiting value in terms of a deterioration of the combustibility, and that if so, at least one actuator of the internal combustion engine, different from an actuator for setting the ignition angle, is driven along the lines of improving the combustibility of the air/fuel mixture. In this manner, the combustion limit for the ignition angle may be shifted, so that a larger range is available for the retardation of the ignition angle, and therefore the setting range for setting the predetermined output variable by retardation of the ignition angle is enlarged. In addition, in this manner, the use of a manipulated variable other than the retardation of the ignition angle to realize the predefined output variable of the internal combustion engine may be limited as far as possible, if not prevented completely. This is advantageous primarily when the further manipulated variable has a negative influence on the exhaust-gas quality compared to the retardation of the ignition angle. For example, this is the case when an injection blank-out is selected as a further manipulated variable, which results in a worsening of the exhaust-gas quality compared to a retardation of the ignition angle.

It is particularly advantageous if an uneven running is selected as a variable characteristic for the combustibility of the air/fuel mixture in the combustion chamber of the internal combustion engine. The uneven running of the internal combustion engine may be determined easily and with little expenditure, and in addition, is a reliable measure for the combustibility of the air/fuel mixture in the combustion chamber of the internal combustion engine.

A further advantage is yielded if, as actuator in the sense of improving the combustibility of the air/fuel mixture, an exhaust-gas recirculation valve is driven in such a way that an exhaust-gas recirculation rate is reduced. In this manner, the portion of an external exhaust-gas recirculation in the combustion-chamber charge may be reduced, and therefore the combustibility of the air/fuel mixture in the combustion chamber of the internal combustion engine may be increased, so that a greater retardation of the ignition angle is allowed without having to put up with an unwelcome poor combustibility of the air/fuel mixture in the combustion chamber of the internal combustion engine.

A corresponding advantage results if, as actuator in the sense of improving the combustibility of the air/fuel mixture, at least one intake valve and/or at least one exhaust valve of at least one cylinder of the internal combustion engine is controlled in its lift and/or in its phase in such a way that an internal residual exhaust-gas rate is reduced. The combustibility of the air/fuel mixture in the combustion chamber of the internal combustion engine is increased in this manner, as well, and a greater range is allowed for the retardation of the ignition angle without having to put up with an unwanted poor combustibility of the air/fuel mixture in the combustion chamber of the internal combustion engine.

An especially simple and low-cost possibility for reducing the internal residual exhaust-gas rate is to control the intake and exhaust valves of at least one cylinder of the internal combustion engine in such a way that a valve-overlap phase of the intake and exhaust valves of the at least one cylinder of the internal combustion engine is reduced. In this manner, less exhaust gas arrives at the combustion chamber of the internal combustion engine via its exhaust valve or exhaust valves.

Furthermore, it is advantageous if, as actuator along the lines of improving the combustibility of the air/fuel mixture, a swirl control valve is driven in such a way that a movement of the charge supplied to the combustion chamber is increased. In this way, the air/fuel mixture in the combustion chamber of the internal combustion engine burns through better and faster, so that the range for the retardation of the ignition angle may be increased in this manner, as well, without having to put up with an unwanted adverse effect on the combustibility of the air/fuel mixture in the combustion chamber of the internal combustion engine.

The movement of the charge fed to the combustion chamber may also be increased particularly easily if, as actuator in the sense of improving the combustibility of the air/fuel mixture, an intake valve of at least one cylinder of the internal combustion engine is controlled with respect to its opening instant in such a way that a movement of the charge fed to the combustion chamber is increased. This also promotes a better and faster burn-through of the air/fuel mixture in the combustion chamber of the internal combustion engine, and therefore a larger range for the retardation of the ignition angle, without an unwanted adverse effect on the combustibility of the air/fuel mixture in the combustion chamber of the internal combustion engine. The same advantage results if, as actuator along the lines of improving the combustibility of the air/fuel mixture, an intake valve of at least one cylinder of the internal combustion engine is controlled with respect to its valve lift in such a way that a movement of the charge fed to the combustion chamber is increased.

In addition, it is advantageous if, in the case in which the exceedance of the predefined limiting value by the variable characteristic for the combustibility of the air/fuel mixture in the combustion chamber of the internal combustion engine cannot be neutralized even by controlling the at least one actuator of the internal combustion engine, different from the actuator for setting the ignition angle, along the lines of improving the combustibility of the air/fuel mixture, the retardation of the ignition angle is limited with the reaching of the predefined limiting value by the variable characteristic for the combustibility of the air/fuel mixture in the combustion chamber of the internal combustion engine, and the predefined output variable of the internal combustion engine is additionally realized by a manipulated variable different from the retardation of the ignition angle, preferably an injection blank-out. This ensures that a maximum possible range for the retardation of the ignition angle is utilized for realizing the predefined output variable of the internal combustion engine by retarding the ignition angle, and when the retardation of the ignition angle has reached the maximum retardation of this range, a manipulated variable different from the retardation of the ignition angle is additionally drawn upon for realizing the predefined output variable, so that the use of this manipulated variable, different from the retardation of the ignition angle, for realizing the predefined output variable of the internal combustion engine is reduced to the greatest extent possible.

Particularly advantageously, the retardation of the ignition angle described is used when a switchover between a first operation of the internal combustion engine with a first number of activated cylinders and a second operation of the internal combustion engine with a second number of activated cylinders, preferably a switchover between full-engine operation and half-engine operation, is selected as the at least one operating state. In this manner, a compensation for the jump in torque at the instant of the switchover may be realized for this operating state, the compensation being based completely or to the greatest extent possible on a retardation of the ignition angle.

A further advantage is yielded if the retardation of the ignition angle compensates for an increase of a cylinder charge in the at least one operating state in terms of maintaining the output variable of the internal combustion engine constant. In this manner, a reserve for the setting of the output variable of the internal combustion engine may be built up by the retardation of the ignition angle, which may then be called on as quickly as possible by readjusting the ignition angle in the advance direction.

An exemplary embodiment of the present invention is represented in the drawing and elucidated in greater detail in the following description.

DETAILED DESCRIPTION

Figure 1:
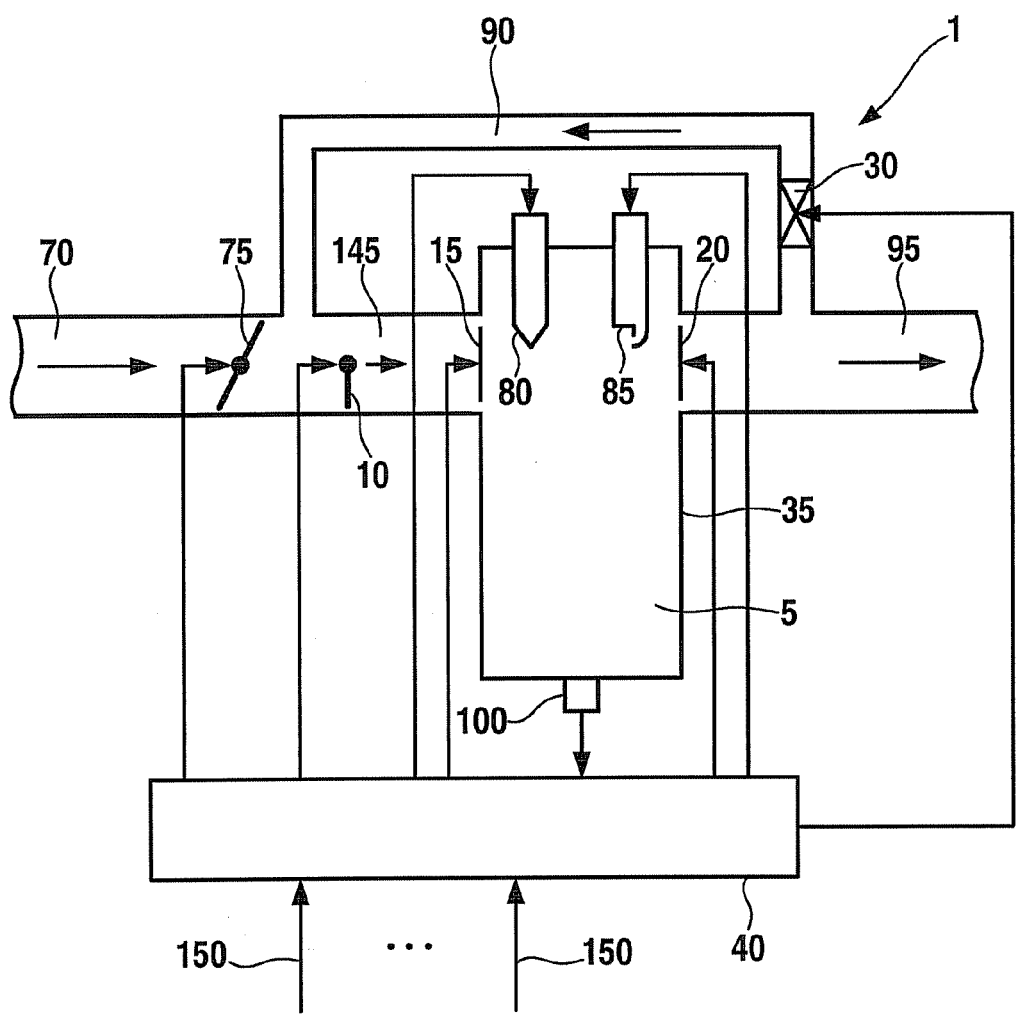
FIG. 1 a schematic view of an internal combustion engine.

In FIG. 1, reference numeral 1 denotes an internal combustion engine in the form of an Otto engine. Internal combustion engine 1 includes one or more cylinders, of which one is represented by way of example in FIG. 1 and denoted by reference numeral 35. Hereinafter, cylinder 35 is considered as example without restricting the generality. Fresh air is supplied to cylinder 35 via an air inlet 70. The quantity of fresh air supplied and therefore the charge of a combustion chamber 5 of cylinder 35 may be influenced by a throttle valve 75 in air inlet 70. To that end, throttle valve 75 is controlled by an engine management 40, for instance, as a function of the degree of actuation of an accelerator pedal of a vehicle powered by internal combustion engine 1. Additionally or alternatively, the degree of opening of throttle valve 75 may also be varied as a function of demands of further control systems on an output variable of internal combustion engine 1, e.g., as a function of the demand of an antilock system, an electronic stability program, a cruise control, an idle speed control, etc. The direction of flow in air inlet 70 is denoted by arrows in FIG. 1. Downstream of throttle valve 75, an exhaust-gas recirculation line 90 opens through into air inlet 70, which downstream of throttle valve 75, changes into the part of air inlet 70 designated as intake manifold 145. Exhaust-gas recirculation line 90 connects an exhaust branch 95 of internal combustion engine 1 to intake manifold 145. Disposed in exhaust-gas recirculation line 90 is an exhaust-gas recirculation valve 30, which is controlled by engine management 40 for adjusting a degree of opening as a function of a predefined exhaust-gas recirculation rate. Downstream of the introduction of exhaust-gas recirculation line 90 into intake manifold 145, a swirl control valve 10 is disposed in intake manifold 145. The degree of opening of swirl control valve 10 is likewise controlled by engine management 40, namely, for example, in such a way that, as in the manner described in DE 10 2004 011 589, the gas supplied to combustion chamber 5 via air inlet 70 and exhaust-gas recirculation line 90 is set into a predefined movement within combustion chamber 5. In this manner, for example, the combustion in combustion chamber 5 may be optimized, particulate emissions may be reduced and the exhaust-gas temperature may be lowered. Downstream of swirl control valve 10, the gas in intake manifold 145 is then drawn into combustion chamber 5 via an intake valve 15 of cylinder 35. In this context, for example, the opening instant, phase and lift of intake valve 15 are controlled by a camshaft. Alternatively, this control may also be accomplished in fully variable manner on the part of engine management 40 if, for example, an electrohydraulic valve control EHVS or an electromagnetic valve control EMVS is provided. Fuel is injected directly into combustion chamber 5 via a fuel injector 80. Alternatively, fuel injector 80 may also be disposed in air inlet 70 or in intake manifold 145 in order to realize a manifold injection that is central or cylinder-specific. Fuel injector 80 is likewise controlled by engine management 40 for setting a desired injection quantity and a desired injection time, e.g., in order to set a predefined air/fuel mixture ratio. The air/fuel mixture located in combustion chamber 5 is ignited by a spark plug 85 whose ignition angle or moment of ignition is likewise set by engine management 40, in order to realize a predefined efficiency of the combustion. The exhaust gas built up during the combustion of the air/fuel mixture in combustion chamber 5 is discharged into exhaust branch 95 via an exhaust valve 20 whose opening instant, phase and lift are likewise controlled by engine management 40 using corresponding means as for the control of intake valve 15. A crankshaft-angle sensor 100 is situated in the area of cylinder 35 and detects the instantaneous crankshaft angle of the crankshaft driven by cylinder 35 or by the cylinders of internal combustion engine 1, and passes it on as a continuous signal to engine management 40. Engine management 40 is supplied with further input variables 150, e.g., in the form of the degree of actuation of the accelerator pedal described above and/or the demands of further control systems. For example, input variables 150 may also include one or more signals which characterize performance quantities of the internal combustion engine, and from which, in a manner familiar to one skilled in the art, engine management 40 derives a measure for the instantaneous torque output by internal combustion engine 1.

Figure 2:
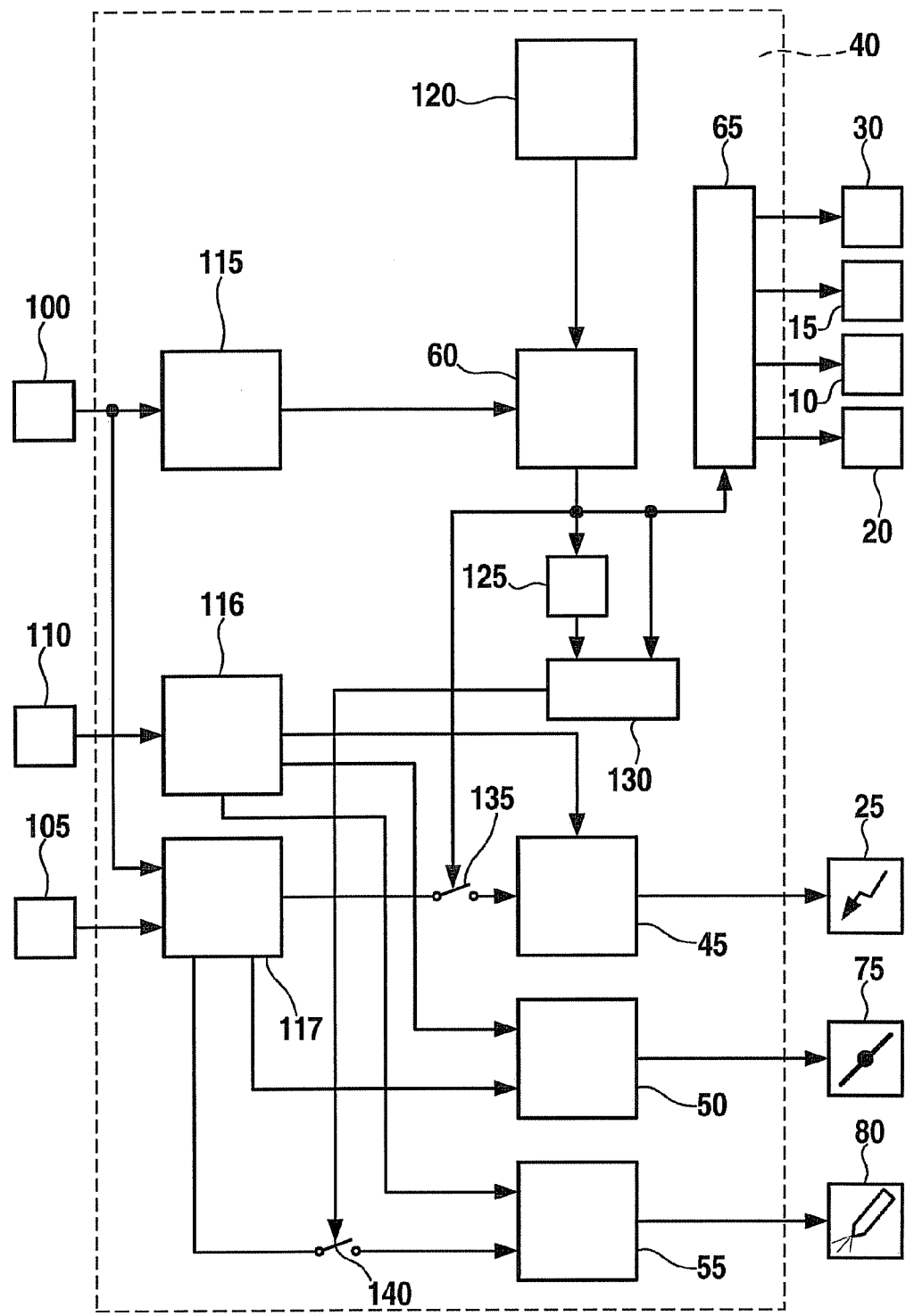
FIG. 2 a functional diagram for explaining the device according to example embodiments of the present invention and the method according to example embodiments of the present invention.

FIG. 2 shows a functional diagram for the device according to example embodiments of the present invention which, for example, may be implemented in the form of hardware and/or software in engine management 40. In this context, the signal from crankshaft-angle sensor 100 is supplied to a first evaluation unit 115. From the crankshaft-angle signal of crankshaft-angle sensor 100 supplied continuously over time, first evaluation unit 115 ascertains the crankshaft angular acceleration of consecutive working cycles of internal combustion engine 1, and ascertains the differences of the crankshaft angular acceleration of consecutive working cycles of internal combustion engine 1 as uneven-running value. The uneven-running values ascertained by first evaluation unit 115 are transmitted to a checking unit 60 and compared there to a predefined limiting value, which is supplied to checking unit 60 from a limiting-value memory 120. For example, the limiting value for the uneven running is applied on a test stand in such a way that, in response to an exceedance of the predefined limiting value by the uneven-running values of first evaluation unit 115 in the sense of a deterioration of the combustibility, the combustibility of the air/fuel mixture in combustion chamber 5 is assessed as no longer adequate for maintaining a comfortable engine operation. If the uneven-running signal, supplied to checking unit 60 by first evaluation unit 115, having the instantaneously ascertained uneven-running value exceeds the predefined limiting value in the sense of a deterioration of the combustibility, then checking unit 60 provides a set signal at its output, otherwise a reset signal. The output of checking unit 60 is supplied on one hand to a time-delay element 125, and on the other hand, to an AND gate 130. Time-delay element 125 delays the output signal of checking unit 60 by a predetermined time. The output signal of time-delay element 125, with the output signal of checking unit 60 delayed by the predetermined time, is supplied to AND gate 130, as well.

AND gate 130 delivers a set signal at its output when its two input signals are set simultaneously, otherwise, AND gate 130 provides a reset signal at its output. Furthermore, a control unit 65 is provided which is supplied with the output signal of checking unit 60 and which drives swirl control valve 10, intake valve 15, exhaust valve 20 and exhaust-gas recirculation valve 30 along the lines of improving the combustibility of the air/fuel mixture in combustion chamber 5 when the output signal of checking unit 60 is set. Otherwise, control unit 65 drives swirl control valve 10, intake valve 15, exhaust valve 20 and exhaust-gas recirculation valve 30 in conventional manner as described above.

In addition, a second evaluation unit 116 is provided which ascertains a setpoint value for an output variable of internal combustion engine 1 as a function of one or more demands. These demands may stem from further control systems of internal combustion engine 1 like, for example, an antilock system, an electronic stability program, a cruise control, an idle speed control and so forth, as well as the degree of actuation of an accelerator pedal of a vehicle powered by internal combustion engine 1. Second evaluation unit 116 coordinates these demands in a manner familiar to one skilled in the art, in order to form a resultant setpoint value for the output variable of internal combustion engine 1 and to convert to, in each instance, a predefined output variable of internal combustion engine 1 for various control paths. For example, the output variable may be a torque or a power output of internal combustion engine 1. In the example according to FIG. 2, an accelerator-pedal module 110 is shown by way of example, which generates a demand for the output variable of internal combustion engine 1 as a function of the degree of actuation of the accelerator pedal, and transmits it to second evaluation unit 116. From this, second evaluation unit 116 derives a predefined output variable for the ignition path, a predefined output variable for the air path and, if indicated, a predefined output variable for the injection path, as well. The predefined output variable of internal combustion engine 1 for the ignition path is supplied to a first implementation unit 45. The predefined output variable of internal combustion engine 1 for the air path is supplied to a second implementation unit 50. The predefined output variable of internal combustion engine 1 for the injection path is supplied to a third implementation unit 55. As a function of the predefined output variable supplied, implementation unit 45 generates an ignition angle to be set or a retard shift of the ignition angle to be set, and drives an actuator 25 for setting this ignition angle. As a function of the predefined output variable of internal combustion engine 1 supplied, second implementation unit 50 ascertains a required degree of opening of throttle valve 75 and drives it accordingly. As a function of the predefined output variable supplied, third implementation unit 55 ascertains a required injection time and quantity and drives fuel injector 80 accordingly to realize the predefined injection time and quantity. The predefined output variable of the internal combustion engine for the ignition-angle path may involve a predefined ignition-angle efficiency. The predefined output variable of the internal combustion engine for the air path may involve a predefined value for the charge of combustion chamber 5 of internal combustion engine 1. The predefined output variable of internal combustion engine 1 for the injection path may involve a predefined injection quantity and injection time for realizing a predefined air/fuel mixture ratio. All predefined output variables for the three control paths indicated share in common that they are ascertained by second evaluation unit 116 in such a way that the demand of accelerator-pedal module 110 on the output variable of internal combustion engine 1, or, correspondingly, the resultant demand on the output variable of internal combustion engine 1 in the case of several different demands on the output variable of internal combustion engine 1 by different control systems, is realized in the form of a desired torque or a desired power output.

The signal of crankshaft-angle sensor 100 is supplied to a third evaluation unit 117, as well as the signal of an ascertainment unit 105, which furnishes the instantaneous value of the output variable of internal combustion engine 1 as a continuous signal to third evaluation unit 117. Third evaluation unit 117 ascertains the instantaneous engine speed of internal combustion engine 1 from the crankshaft-angle signal of crankshaft-angle sensor 100 by differentiation. As a function of the ascertained engine speed and the supplied instantaneous value of the output variable of internal combustion engine 1, third evaluation unit 117 checks whether a switchover of the operation of internal combustion engine 1 with a first number of activated cylinders to an operation of internal combustion engine 1 with a second number of activated cylinders is possible, the first number of cylinders being greater than the second number of activated cylinders. For example, third evaluation unit 117 checks whether a switchover from full-engine operation in which all cylinders of internal combustion engine 1 are activated, to half-engine operation in which only half the cylinders of internal combustion engine 1 are activated is possible. This is the case when both the instantaneous engine speed and the instantaneous value for the output variable of internal combustion engine 1 each lie in a predefined range. This range may be determined in a manner familiar to one skilled in the art. If third evaluation unit 117 determines that the described switchover between the operating modes of internal combustion engine 1 with the different number of activated cylinders is possible, it then prompts second implementation unit 50 to increase the charge of internal combustion engine 1 along the lines of building up a reserve for the output variable of internal combustion engine 1. Moreover, third evaluation unit 117 prompts first implementation unit 45 to retard the ignition angle, in order to compensate for the charge increase in view of its influence on the output variable of internal combustion engine 1. At the instant of the switchover between the operating modes of internal combustion engine 1 using the different number of activated cylinders, the built-up reserve for the output variable of internal combustion engine 1 may then be called upon by advancing the ignition angle, so that a jump in torque of internal combustion engine 1 at the instant of the switchover is avoided. The prompt by third evaluation unit 117 for the ignition-timing retard may be supplied to first implementation unit 45 via a first controlled switch 135, which is controlled as a function of the output signal of checking unit 60. If the output signal of checking unit 60 is set, then first controlled switch 135 is opened; otherwise, thus in the case of a reset output signal of checking unit 60, first controlled switch 135 is closed. This means that the retard shift of the ignition angle is limited to the value which exists upon determination of an exceedance of the limiting value for the uneven-running values in the sense of a deterioration of the combustibility. At the same time, by the set output signal of checking unit 60, control unit 65 is prompted to drive actuators 10, 15, 20, 30 along the lines of improving the combustibility of the air/fuel mixture. If the uneven-running signal thereupon drops below the predefined limiting value in the sense of an improvement of the combustibility, then the output signal of checking unit 60 is reset, and therefore first controlled switch 135 is closed again in order to permit a further retard shift of the ignition angle up to the instant at which the uneven-running signal again exceeds the predefined limiting value, and therefore a further retard of the ignition angle must be discontinued up until a possible improvement again in the combustibility of the air/fuel mixture due to suitable driving of actuators 10, 15, 20, 30. In addition, third evaluation unit 117 requests from third implementation unit 55 a blank-out of injections as soon as a second predefined switch 140 is closed, with the aim of compensating, in torque-neutral fashion, for the increase in charge necessary for the reserve to be built up. In this context, second controlled switch 140 is driven by the output signal of AND gate 130. Thus, if the output signal of AND gate 130 is set, then second controlled switch 140 is closed and the injection blank-out is activated; otherwise, thus in response to the reset output signal of AND gate 130, second controlled switch 140 is opened and the injection blank-out is therefore prevented. For example, the predefined time of time-delay element 125 may be suitably applied on a test stand in such a way that it corresponds at most to the time in which, calculated from the instant of the setting of the output signal of checking unit 60, an improvement in the combustibility of the air/fuel mixture due to the driving of actuators 10, 15, 20, 30 may safely be expected. If the expected improvement in the combustibility of the air/fuel mixture does not occur within this predefined time, then the improvement in the combustibility of the air/fuel mixture can no longer be realized by the driving of actuators 10, 15, 20, 30, so that the increase in charge must now also be offset by the blank-out of injections, and therefore second controlled switch 140 must be closed. However, if the combustibility of the air/fuel mixture improves within the predefined time, then by the setting of the output signal of time-delay element 125, the output signal of checking unit 60 is already reset again, so that the output signal of AND gate 130 remains reset, and second controlled switch 140 remains open, and therefore no injection blank-out takes place.

Figure 3:
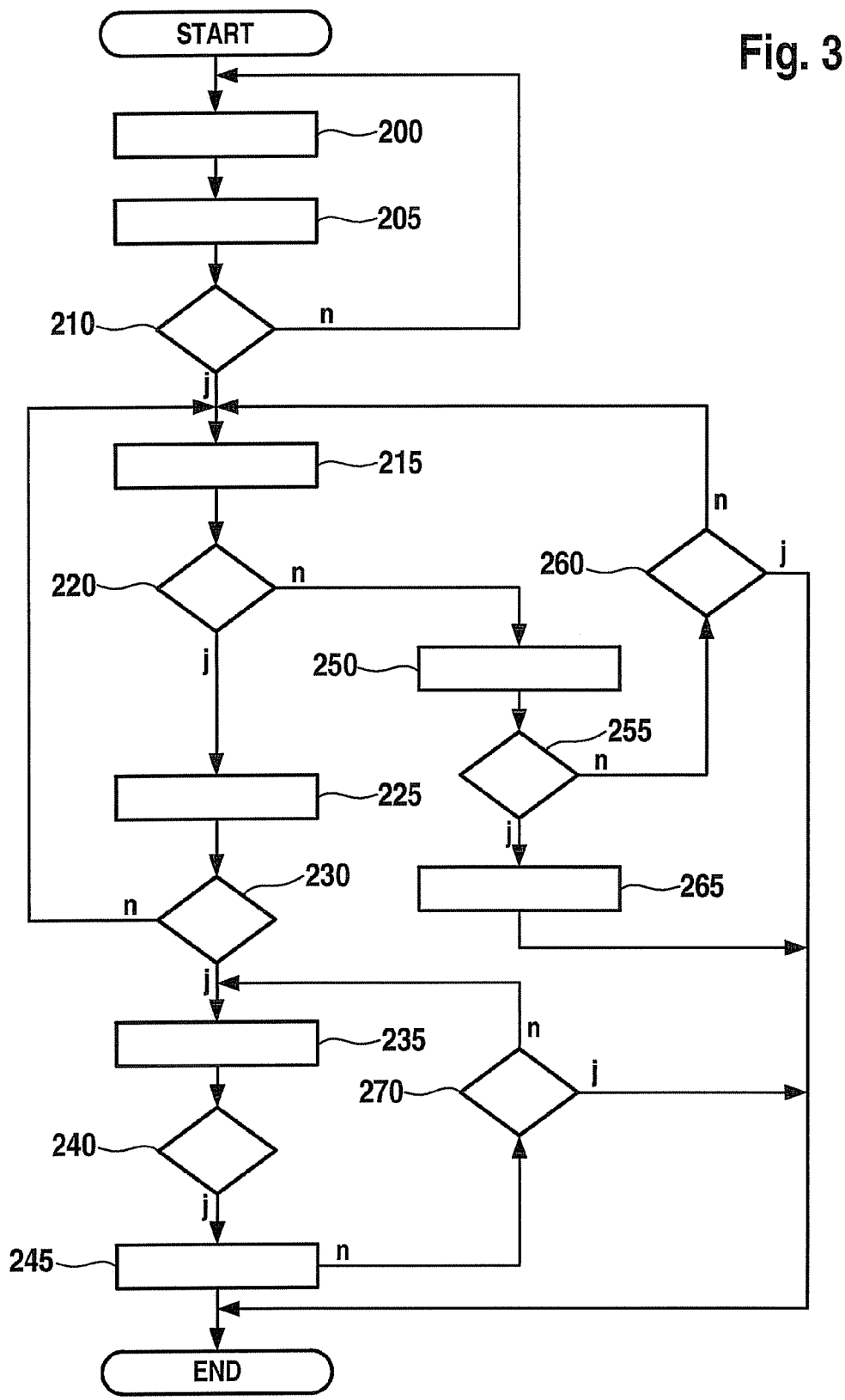
FIG. 3 a flow chart for an exemplary sequence of the method according to example embodiments of the present invention.

FIG. 3 shows a flow chart for an exemplary sequence of the method according to example embodiments of the present invention.

With the start of the program from full-engine operation, at a program point 200, the signals of crankshaft-angle sensor 100, accelerator-pedal module 110 and possibly further control systems as well as ascertainment unit 105 are acquired, and a counter is set to zero. The program subsequently branches to a program point 205.

At program point 205, from the signals of accelerator-pedal module 110 and possibly further control systems, second evaluation unit 116 ascertains a setpoint value for the output variable of internal combustion engine 1. The program subsequently branches to a program point 210.

At program point 210, based on the signals from crankshaft-angle sensor 100 and ascertainment unit 105, third evaluation unit 117 checks whether a switchover from full-engine operation to half-engine operation is possible. If so, the program branches to a program point 215, otherwise back to program point 200.

At program point 215, from the signal of crankshaft-angle sensor 100, first evaluation unit 115 ascertains the instantaneous uneven-running value and transmits it to checking unit 60. The program subsequently branches to a program point 220.

At program point 220, checking unit 60 checks whether the instantaneous uneven-running value exceeds the predefined limiting value in terms of a deterioration of combustibility. If so, the program branches to a program point 225, otherwise, to a program point 250.

At program point 225, the output signal of checking unit 60 is set, and with that, first controlled switch 135 is opened, and therefore a further retard shift of the ignition angle is stopped; the ignition angle is thus retained at its current position. Moreover, at program point 225, actuators 10, 15, 20, 30 are driven by control unit 65 along the lines of improving the combustibility of the air/fuel mixture, based on the set output signal of checking unit 60. The counter is thereupon incremented by one. The program subsequently branches to a program point 230.

At program point 230, it is checked whether the value of the counter reaches or exceeds a predefined threshold value. If so, the program branches to a program point 235, otherwise, back to program point 215 in order, at program point 215, to ascertain the uneven-running value then current.

The function of the counter in the flow chart according to FIG. 3 corresponds to the function of time-delay element 125 in the functional diagram according to FIG. 2. Therefore, the function of the predefined threshold value for the counter in the flow chart according to FIG. 3 corresponds to the predefined time for time-delay element 125 according to FIG. 2 and is applied accordingly. At program point 235, and therefore with the expiration of the predefined time, the output signal of time-delay element 125 is set, and on the basis of the output signal of checking unit 60 which is likewise set, the output signal of AND gate 130 is set, and thus the injection blank-out is enabled by closure of second controlled switch 140. Consequently, at program point 235, the charge is increased by a predefined differential value by suitable control on the part of second implementation unit 50, and this increase in charge is offset in its effect on the output variable of internal combustion engine 1 by suitable control of the injection quantity and injection time of fuel injector 80 by third implementation unit 55. The program subsequently branches to a program point 240.

At program point 240, second implementation unit 50 checks whether it has already completely realized the specification of third evaluation unit 117 with respect to the charge increase. If so, the program branches to a program point 245, otherwise, to a program point 270.

At program point 245, the switchover to half-engine operation may then be implemented by deactivating half the cylinders of internal combustion engine 1, that is, by cutoff, and therefore, during the half-engine operation, permanent closure of all intake and exhaust valves of the cylinders to be deactivated. The program is subsequently exited. At program point 270, second implementation unit 50 checks whether a maximum possible charge of combustion chamber 5 of internal combustion engine 1 was reached. If so, the program is exited and no switchover is brought about to half-engine operation; otherwise, the program branches back to program point 235 and the charge is further incremented as described above, the increase in charge thereby produced being offset by suitable injection blank-out in view of the effect on the output variable of internal combustion-engine 1.

At program point 250, second implementation unit 50 likewise increases the charge in the manner described by a predefined increment, in this case, the effect on the output variable of internal combustion engine 1 caused by this being offset by suitable retardation of the ignition angle. The program subsequently branches to a program point 255.

At program point 255, second implementation unit 50 checks, in the manner previously described, whether the specification of third evaluation unit 117 for the increase in charge was completely realized. If so, the program branches to a program point 265, otherwise, to a program point 260.

At program point 265, a switchover to half-engine operation is brought about in the manner described. The program is subsequently exited.

At program point 260, second implementation unit 50 checks whether the maximum possible charge was already reached. If this is the case, the program is exited and no switchover to half-engine operation is carried out; otherwise, the program branches back to program point 215 in order, at program point 215, to ascertain the instantaneous uneven-running value existing then.

Figure 4:
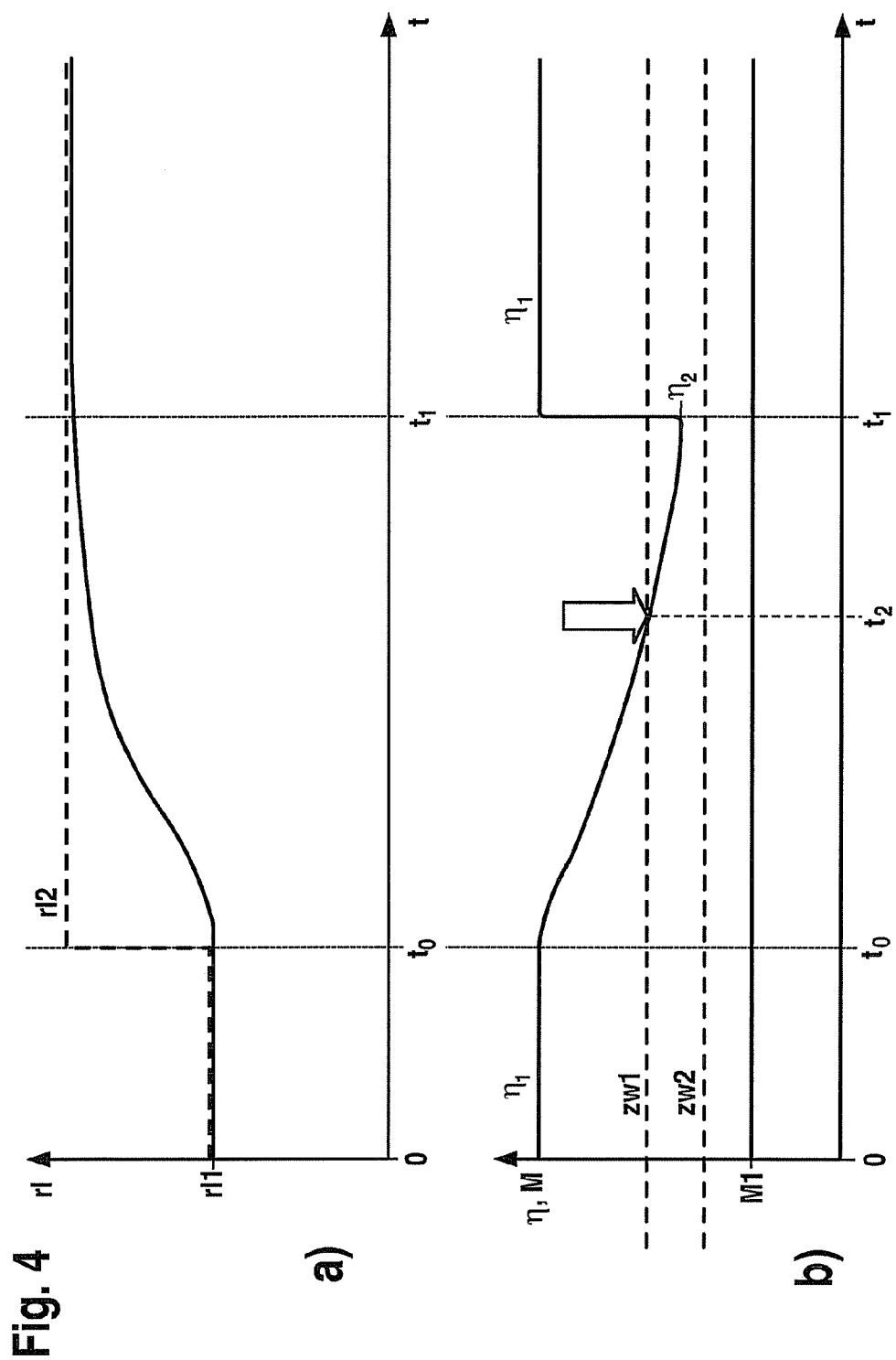
FIG. 4a a timing diagram for a charge characteristic of an internal combustion engine.
FIG. 4b a time characteristic for an efficiency and a torque of the internal combustion engine.

FIG. 4 shows an example for the switchover from full-engine operation to half-engine operation. For this purpose, the time characteristic of charge rl is shown in FIG. 4a), and the time characteristic of ignition-angle efficiency η and of torque M of internal combustion engine 1 are shown in FIG. 4b). In so doing, in FIG. 4a), the characteristic of the setpoint value for charge rl is represented with a broken line, and the characteristic for the actual value of the charge is represented in the form of a solid line. The solid line with thin line thickness in FIG. 4b) denotes the time characteristic of ignition-angle efficiency η, whereas the thick solid line in FIG. 4b) denotes the time characteristic of torque M of internal combustion engine 1. At an instant t=0, internal combustion engine 1 is in full-engine operation. Up to a first instant $t_0$>0, the setpoint value and the actual value for charge rl both assume the same first charge value rl1. Up to first instant $t_0$, ignition-angle efficiency η lies at a first ignition-angle-efficiency value $η_1$. At first instant $t_0$, it is determined at program point 210 that the intention is to switch over from full-engine operation to half-engine operation. Therefore, from first instant $t_0$ up to a following second instant $t_1$, the switchover to half-engine operation is prepared. To that end, at first instant $t_0$, the setpoint value for charge rl is increased abruptly from first charge value rl1 to a second charge value rl2. First of all, because of the delay as a result of the intake-manifold dynamics, the actual value for charge rl cannot abruptly match the sudden change in the charge setpoint value, and also, on the basis of the exemplary embodiment described, new setpoint value rl2 is tracked, for example, only successively as described, in order to offset the described compensation for the charge increase by the lowering of the ignition-angle efficiency and possibly by the blank-out of injections as a function of the instantaneous uneven-running measurements. In so doing, the goal is to realize a predefined, constant, desired torque M1 before, during and after the switchover from full-engine operation to half-engine operation, so that the actual torque of the internal combustion engine corresponds constantly to desired torque M1 before, during and after the switchover from full-engine operation to half-engine operation, as well, as shown in FIG. 4b). To compensate for the increase in charge as of first instant $t_0$, as shown in FIG. 4b), from first instant $t_0$, ignition-angle efficiency η is lowered, and specifically, in such a way that the effect of the charge increase on the torque of internal combustion engine 1 is precisely offset by the lowering of the ignition-angle efficiency, so that internal combustion engine 1 constantly outputs torque M1. As described, the decrease in ignition-angle efficiency η is brought about by the retardation of the ignition angle. In this context, at a third instant $t_2$ between first instant $t_0$ and second instant $t_1$, a first ignition angle zw1 is reached, and for the first time, an exceedance of the predefined limiting value by the instantaneous uneven-running value is detected. First ignition angle zw1 therefore designates the reaching of the combustion limit at third instant $t_2$. A further retardation of the ignition angle beyond first ignition angle zw1 would therefore lead to an unacceptable deterioration in the running smoothness of internal combustion engine 1. Therefore, at third instant $t_2$, the charge movement in combustion chamber 5 is increased by the measures described, and the residual exhaust-gas rate, thus the portion of residual exhaust gas in the gas mixture in combustion chamber 5, is reduced, in order to shift the combustion limit in the direction of an even more retarded ignition angle in comparison to first ignition angle zw1. If this is no longer possible, then the desired increase in charge must be offset by injection blank-out. However, in the example according to FIG. 4b), the combustion limit is able to be shifted to a second ignition angle zw2 which is later than first ignition angle zw1. Therefore, ignition-angle efficiency η may also be reduced beyond third instant $t_2$. At second instant $t_1$, the actual value of cylinder charge rl reaches setpoint value rl2 of the cylinder charge without the ignition angle having to be shifted up to second ignition angle zw2 at second instant $t_1$. Thus, at second instant $t_1$, the ignition angle reaches a value between first ignition angle zw1 and second ignition angle zw2. Therefore, at second instant $t_1$, the conditions are present for the switchover to half-engine operation which, in order to adjust the same desired torque M1 as in full-engine operation, requires double the charge. That is why second charge value rl2 is also twice as great as first charge value rl1. Therefore, for the switchover from full-engine operation to half-engine operation at second instant $t_1$, ignition-angle efficiency η is increased again abruptly or in stepped fashion from value $η_2$, reached at second instant $t_1$, to first ignition-angle efficiency $η_1$ by suitable advance of the ignition angle, so that as of second instant $t_1$, the half-engine operation is realized with second charge value rl2, and therefore with the still constant torque M1.

Thus, the period of time between first instant $t_0$ and second instant $t_1$ is necessary to prepare for the switchover from full-engine operation to half-engine operation.

In the subject matter of example embodiments of the present invention, an actuator 10, 15, 20, 30 of internal combustion engine 1 that is different from actuator 25 for setting the ignition angle is driven to improve the combustibility of the air/fuel mixture. In principle, the combustibility of the air/fuel mixture in combustion chamber 5 of internal combustion engine 1 may be improved by two different measures. First of all, by decreasing the residual exhaust-gas rate in the gas mixture in combustion chamber 5, and secondly, in addition or alternatively, by increasing the charge movement of the gas mixture in combustion chamber 5. Several different possibilities are available for reducing the residual exhaust-gas rate, which may be implemented individually or in any combination. The residual exhaust-gas rate is a function of the external exhaust-gas recirculation and the internal exhaust-gas recirculation. Therefore, the combustibility of the air/fuel mixture may be improved if exhaust-gas recirculation valve 30 is controlled in such a way that the external exhaust-gas recirculation rate is reduced. The internal residual exhaust-gas rate, which, on the basis of the internal exhaust-gas recirculation, results as a function of the setting of intake and exhaust valves 15, 20 of respective cylinder 35, may be reduced to improve the combustibility of the air/fuel mixture by suitably controlling at least one intake valve 15 and/or at least one exhaust valve 20 of the at least one cylinder 35 in its lift and/or its phase. For example, such a suitable control involves reducing a valve-overlap phase of intake and exhaust valves 15, 20 of the at least one cylinder 35 of internal combustion engine 1. The valve-overlap phase is that time range or angular range in which both the intake and exhaust valves of cylinder 35 are open, so that residual exhaust gas from exhaust branch 95 may be drawn into combustion chamber 5 via the corresponding exhaust valve during an induction stroke of cylinder 35. For example, a suitable control of intake and/or exhaust valves 15, 20 of the at least one cylinder 35 may be realized by a variable camshaft timing control or by a fully variable valve gear on the basis, for instance, of an electrohydraulic valve control and/or an electromagnetic valve control. In addition or as an alternative to the lowering of the residual exhaust-gas rate in combustion chamber 5 of internal combustion engine 1, one or more measures for increasing the movement of the charge supplied to combustion chamber 5 may be implemented in any combination in order to improve the combustibility of the air/fuel mixture, and consequently to postpone the combustion limit, i.e., the latest possible ignition angle for acceptable uneven-running values. For instance, the movement of the charge supplied to combustion chamber 5 may be increased by transferring swirl control valve 10, if present, to a turned-on, closed or nearly closed position. Due to the specific position, a swirl may be generated for the air stream admitted into combustion chamber 5. Additionally or alternatively, such a swirl generation may also be produced by suitable control of at least one intake valve 15 of the at least one cylinder 35 of internal combustion engine 1 with regard to the opening instant of the intake valve and/or with regard to the lift of intake valve 15, so that the movement of the charge supplied to combustion chamber 5 may be increased in this manner, as well, and with that, the combustibility of the air/fuel mixture may be improved, and consequently, the combustion limit may be postponed in the manner described. For the control of intake valve 15 described, it is likewise advantageous if a variable camshaft timing control or a fully variable valve gear like, for example, in the case of an electrohydraulic or an electromagnetic valve control, is provided. If, in spite of these measures used individually or in any combination, a reduction of the instantaneous uneven-running value to below the predefined limiting value cannot be realized in the setting of the desired output variable of internal combustion engine 1, then the retardation of the ignition angle is limited with the reaching of the predefined limiting value by the instantaneous uneven-running value, so that a further retard shift of the ignition angle is prevented because of the exceedance of the predefined limiting value by the instantaneous uneven-running value then occurring, and the predefined output variable of internal combustion engine 1 is then additionally realized by a variable different from the retardation of the ignition angle like, for example, an injection blank-out.

In the example described above, the switchover from full-engine operation to half-engine operation or, more generally, the switchover from a first operating state of internal combustion engine 1 with a first number of activated cylinders to a second operating state of internal combustion engine 1 with a second number of activated cylinders which is less than the first number of activated cylinders was described as the operating state in which a predefined output variable of internal combustion engine 1 is realized at least by a retardation of the ignition angle, the intention being to hold the output variable of internal combustion engine 1 constant during this switchover. In this context, a charge buildup necessary for the switchover to be carried out was offset by the retardation of the ignition angle. However, the present invention is not restricted to this special switchover operation of internal combustion engine 1. Rather, it may be used quite generally in corresponding manner when a predefined output variable of internal combustion engine 1, e.g., a torque or a power output in at least one operating state of internal combustion engine 1 is to be realized by at least a retardation of the ignition angle, and specifically, also without an increase in the charge of the internal combustion engine having to be offset by the retardation of the ignition angle. The case is also possible in which the predefined output variable of the internal combustion engine is to be reduced simply by a retardation of the ignition angle. In such a realization of the setting of a predefined output variable of the internal combustion engine by at least a retardation of the ignition angle, in the event the combustion limit of internal combustion engine 1 is reached by the retardation of the ignition angle, in principle, it involves taking measures by which the combustion limit is further postponed, and therefore a further retardation of the ignition angle is possible. This is permitted by an ongoing ascertainment of the variable characteristic for the combustibility of the air/fuel mixture in combustion chamber 5 of internal combustion engine 1, and its comparison to the predefined limiting value. As soon as the variable characteristic for the combustibility exceeds the predefined limiting value in terms of a deterioration of the combustibility, the reaching of the combustion limit is detected and at least one actuator 10, 15, 20, 30 of internal combustion engine 1 that is different from actuator 25 for setting the ignition angle is driven in the manner described along the lines of improving the combustibility of the air/fuel mixture, namely, for example, to reduce the residual exhaust-gas rate in the combustion chamber and/or to increase the charge movement. Therefore, owing to the subject matter of example embodiments of the present invention, by improving the combustibility of the air/fuel mixture in combustion chamber 5, the combustion limit and therefore the latest possible ignition angle may be further shifted, so that a supplementary injection blank-out for realizing the predefined output variable of internal combustion engine 1, e.g., to compensate for the charge buildup, may be prevented or at least carried out at a later instant and to a lesser extent. In this way, a deterioration in the exhaust-gas quality caused by the injection blank-out may be prevented or at least reduced.

For instance, a similar situation as in the switchover from full-engine operation to half-engine operation occurs when one or more cylinders of internal combustion engine 1 is/are operated in a first operating state with a first lift of the intake valves, and in a second operating state with a second lift of the intake valves, the first valve lift and the second valve lift differing from each other. If, for example, in this context, a switch is made from a larger valve lift to a smaller valve lift, then a situation results analogous to the switchover from full-engine operation to half-engine operation which, analogous to the manner described in FIGS. 2 and 3, is realized using a retardation of the ignition angle to compensate for a charge buildup, and possibly a shift of the combustion limit, if need be, additionally using an injection blank-out.

What is claimed is:

1. A method for operating an internal combustion engine, comprising:
   obtaining a predefined output variable of the internal combustion engine in at least one operating state of the internal combustion engine at least by a retardation of an ignition angle;
   checking whether, due to the retardation of the ignition angle, a variable characteristic for a combustibility of an air/fuel mixture in a combustion chamber of the internal combustion engine exceeds a predefined limiting value in terms of a deterioration of the combustibility, and if the predefined limiting value is exceeded, driving at least one actuator of the internal combustion engine, which is different from an actuator for setting the ignition angle, to improve the combustibility of the air/fuel mixture; and
   compensating for a jump in torque at an instant of a switchover between a first operation of the internal combustion engine with a first number of activated cylinders and a second operation of the internal combustion engine with a second number of activated cylinders, wherein the compensating is substantially based on the retardation of the ignition angle.

2. The method according to claim 1, wherein an uneven running is selected as the variable characteristic for the combustibility of the air/fuel mixture in the combustion chamber of the internal combustion engine.

3. The method according to claim 1, wherein as the actuator along lines of improving the combustibility of the air/fuel mixture, an exhaust-gas recirculation valve is driven such that an exhaust-gas recirculation rate is reduced.

4. The method according to claim 1, wherein as the actuator along lines of improving the combustibility of the air/fuel mixture, at least one of (a) an intake valve and (b) an exhaust valve of at least one cylinder of the internal combustion engine is controlled in at least one of (a) a lift and (b) a phase such that an internal residual exhaust-gas rate is reduced.

5. The method according to claim 4, wherein the intake and exhaust valves of at least one cylinder of the internal combustion engine are controlled such that a valve-overlap phase of the intake and exhaust valves of the at least one cylinder of the internal combustion engine is reduced.

6. The method according to claim 1, wherein as the actuator along lines of improving the combustibility of the air/fuel mixture, a swirl control valve is driven such that a movement of a charge supplied to the combustion chamber is increased.

7. The method according to claim 1, wherein as the actuator along lines of improving the combustibility of the air/fuel mixture, an intake valve of at least one cylinder of the internal combustion engine is controlled with respect to an opening instant such that a movement of a charge supplied to the combustion chamber is increased.

8. The method according to claim 1, wherein as the actuator along lines of improving the combustibility of the air/fuel mixture, an intake valve of at least one cylinder of the internal combustion engine is controlled with respect to a lift such that a movement of a charge supplied to the combustion chamber is increased.

9. The method according to claim 1, wherein, in the case in which an exceedance of the predefined limiting value by the variable characteristic for the combustibility of the air/fuel mixture in the combustion chamber of the internal combustion engine cannot be neutralized even by controlling the at least one actuator of the internal combustion engine, different from the actuator for setting the ignition angle, along the lines of improving the combustibility of the air/fuel mixture, the retardation of the ignition angle is limited with a reaching of the predefined limiting value by the variable characteristic for the combustibility of the air/fuel mixture in the combustion chamber of the internal combustion engine, and the predefined output variable of the internal combustion engine is realized additionally by at least one of (a) a manipulated variable different from the retardation of the ignition angle and (b) an injection blank-out.

10. The method according to claim 1, wherein the retardation of the ignition angle offsets an increase in a cylinder charge in at least one operating state in the sense of maintaining the output variable of the internal combustion engine constant.

11. The method according to claim 1, wherein a switchover between full-engine operation and half-engine operation is selected as the at least one operating state.

12. A device for operating an internal combustion engine, comprising:
   an implementation device adapted to obtain a predefined output variable of the internal combustion engine in at least one operating state of the internal combustion engine by at least a retardation of an ignition angle;
   a check device adapted to check whether, due to the retardation of the ignition angle, a variable characteristic for a combustibility of the air/fuel mixture in a combustion chamber of the internal combustion engine exceeds a predefined limiting value in terms of a deterioration of the combustibility; and
   a control device adapted to control at least one actuator of the internal combustion engine, which is different from an actuator for setting the ignition angle, along the lines of improving the combustibility of the air/fuel mixture,
   wherein a jump in torque at an instant of a switchover between the at least one operating state of the internal combustion engine with a first number of activated cylinders and a second operating state of the internal combustion engine with a second number of activated cylinders is compensated, and
   wherein the compensating is substantially based on the retardation of the ignition angle.

13. The device according to claim 12, wherein a switchover between full-engine operation and half-engine operation is selected as the at least one operating state.

* * * * *